(12) United States Patent
Ham et al.

(10) Patent No.: US 8,111,267 B2
(45) Date of Patent: Feb. 7, 2012

(54) CONTROLLING IMAGE AND MOBILE TERMINAL

(75) Inventors: Kang Sic Ham, Seoul (KR); Kwang Ho Eom, Seoul (KR); Jonghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 968 days.

(21) Appl. No.: 12/078,721

(22) Filed: Apr. 3, 2008

(65) Prior Publication Data

US 2008/0246778 A1    Oct. 9, 2008

(30) Foreign Application Priority Data

Apr. 3, 2007    (KR) ........................ 10-2007-0032715

(51) Int. Cl.
*G09G 5/00*    (2006.01)
*G06F 3/041*    (2006.01)
*G06T 13/00*    (2006.01)
*G06F 17/00*    (2006.01)

(52) U.S. Cl. ........ 345/646; 345/173; 345/473; 345/619; 463/31

(58) Field of Classification Search ........... 345/473–475
See application file for complete search history.

(56) References Cited

U.S. PATENT DOCUMENTS

| | | | |
|---|---|---|---|
| 6,774,900 B1 * | 8/2004 | Kubota et al. | 345/473 |
| 7,391,420 B1 * | 6/2008 | Coyne | 345/473 |
| 2004/0095359 A1 * | 5/2004 | Simon et al. | 345/619 |
| 2005/0219223 A1 * | 10/2005 | Kotzin et al. | 345/173 |
| 2006/0089197 A1 * | 4/2006 | Ajioka | 463/31 |

\* cited by examiner

*Primary Examiner* — Michelle K Lay
*Assistant Examiner* — Sing-Wai Wu
(74) *Attorney, Agent, or Firm* — Birch, Stewart, Kolasch & Birch, LLP (57) ABSTRACT

A method of displaying information on a mobile terminal. The method includes displaying an object on a screen of the mobile terminal, receiving at least two least two input signals corresponding to the displayed object, and animating the displayed object based on the at least two signals corresponding to the displayed object. In addition, the at least two input signals include a) first and second touching signals of the screen of the mobile terminal, b) touching and tilting signals of the mobile terminal, or c) a first proximity signal and a second proximity signal of the mobile terminal.

12 Claims, 10 Drawing Sheets
(4 of 10 Drawing Sheet(s) Filed in Color)

CONTROLLING IMAGE AND MOBILE TERMINAL

This non-provisional application claims priority under 35 U.S.C. §119(a) to Patent Application No. 10-2007-0032715 filed in Republic of Korea on Apr. 3, 2007, the entire contents of which are hereby incorporated by reference.

BACKGROUND OF THE INVENTION

1. Field of the Invention

The present invention relates to a mobile terminal and corresponding method for controlling a displayed image on the mobile terminal.

2. Description of the Related Art

Mobile terminals now provide many additional services besides the basic call service. For example, mobile terminal users can now access the Internet, send and receive text messages, play games, watch videos, etc. using their mobile terminal. Mobile terminals are also becoming a necessity for many users, and each user often prefers a mobile terminal that includes particular features he or she may want (e.g., many younger people want text messaging features, whereas older people may not desire text messages features).

Therefore, manufactures are not providing a variety of different mobile terminals that the user may choose. Further, the additional functions provided on the mobile terminals often determine whether a user buys a particular mobile terminal.

SUMMARY OF THE INVENTION

Accordingly, one object of the present invention is to address the above-noted and other problems.

Another object of the present invention is to provide a mobile terminal in which a user can animate an object or picture on the display using various inputting methods.

To achieve these and other advantages and in accordance with the purpose of the present invention, as embodied and broadly described herein, the present invention provides in one aspect a method of displaying information on a mobile terminal. The method includes displaying an object on a screen of the mobile terminal, receiving at least two least two input signals corresponding to the displayed object, and animating the displayed object based on the at least two signals corresponding to the displayed object. In addition, the at least two input signals include a) first and second touching signals of the screen of the mobile terminal, b) touching and tilting signals of the mobile terminal, or c) a first proximity signal and a second proximity signal of the mobile terminal.

In another aspect, the present invention provides a mobile terminal including a touch screen display unit configured to display an object on a screen of the mobile terminal, an input unit configured to receive at least two input signals corresponding to the displayed object, and a control unit configured to animate the displayed object based on the at least two signals corresponding to the displayed object. In addition, the at least two input signals include a) first and second touching signals of the screen of the mobile terminal, b) touching and tilting signals of the mobile terminal, or c) a first proximity signal and a second proximity signal of the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The present invention will become more fully understood from the detailed description given hereinbelow and the accompanying drawings, which are given by illustration only, and thus are not limitative of the present invention, and wherein.

DETAILED DESCRIPTION OF THE INVENTION

An image control method and a mobile terminal according to embodiments of the present invention will now be described in detail with reference to the accompanying drawings.

Figure 1:
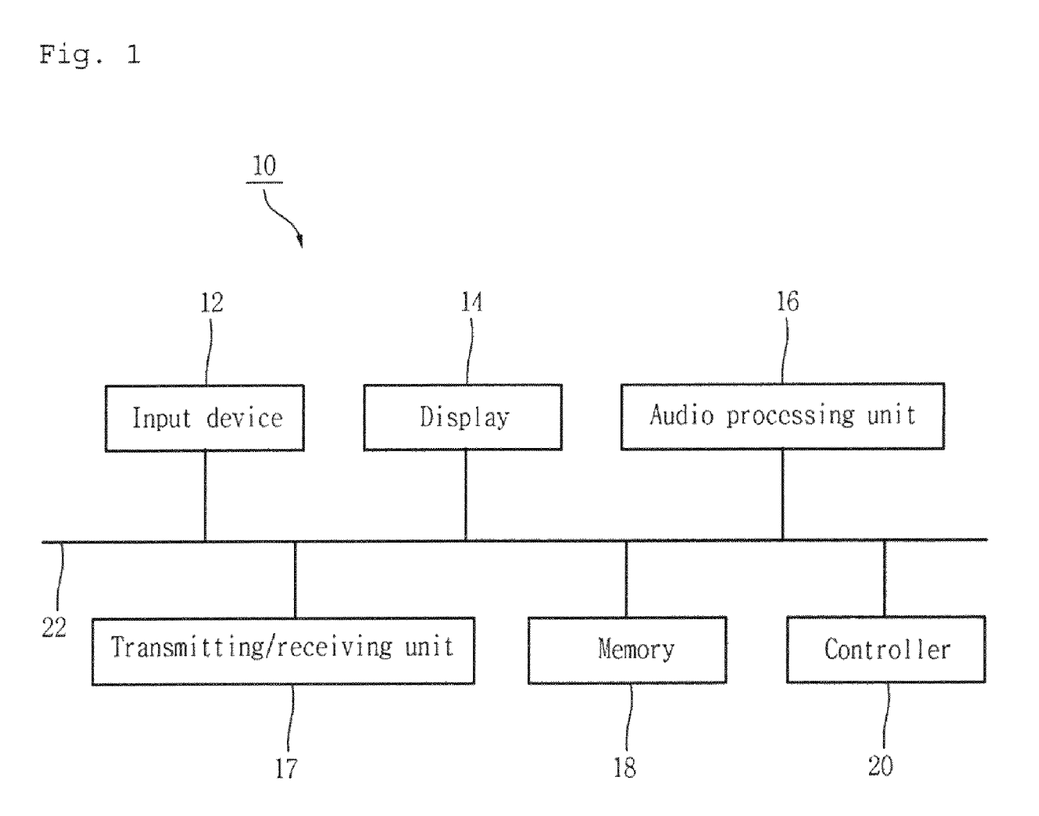
FIG. 1 is a block diagram of a mobile terminal according to an embodiment of the present invention.

FIG. 1 is a block diagram of a mobile terminal 10 according to an embodiment of the present invention. As shown, the mobile terminal 10 includes an input device 12, a display 14, an audio processing unit 16, a transmitting/receiving unit (transceiver) 17, a memory 18, and a controller 20 that are connected together via a bus 22. Further, not all elements need be connected to a single or common bus, but may be individually connected together.

The input device 12 is an interface that communicates with a peripheral device or a user. For example, the input device 12 may be a keypad including a plurality of key buttons, a navigation key including various direction keys, a jog device that selects an input according to an amount of rotation, an audio input device including a sound recognizing device, a touch input device such as a touch pad or a touchscreen, etc.

The input device 12 may also include a tilt sensor that senses a tilting of the terminal 10. That is, the tilt sensor senses the mobile terminal 10 is being titled and generates a corresponding tilt signal. In addition, the input device 12 may also include an inductive proximity sensor that senses an object approaching the terminal 10. That is, the proximity sensor senses an object approaching or moving away from the mobile terminal 10 and generates a corresponding proximity signal. Thus, the input device 12 is configured to receive various information or commands from a user or peripheral device.

Further, the display 14 displays various information such as processing and control operations of the terminal 10, various images, etc. under control of the controller 20. For example, the display 14 displays different images, objects, pictures, figures, text information, menu options etc. to the user. Thus, the user can view an ongoing status of the various processing and control operations of the terminal 10.

In addition, the display 14 may also include a touch screen that the user can touch to input information into the terminal 10. In this instance, the display 14 includes features of the input device 12 such that the input device 12 may be reduced or eliminated. The input device 12 and the display 14 may also be integrated into a single unit.

In addition, the audio processing unit 16 processes audio signals such that sounds can be input and output via a microphone MIC and a speaker SPK, respectively. For example, the audio processing unit 16 can output particular sounds based on a user animating a displayed image according to embodiments of the present invention. The audio processing unit 16 may also include a sound recognizing device such that a user can input commands or other information into the terminal 10.

Further, the transmitting/receiving unit 17 performs voice or data communication via a wired/wireless communication network. Thus, the mobile communication terminal 10 can perform various communications such as voice call communication, video call communication, message transmission, Web page access, data transmission/reception, call connection, instant messenger, etc. using the transmitting/receiving unit 17.

In addition, the memory 18 stores a program used for the processing and controlling performed by the controller 20, reference data, various data, images, phone numbers, etc. The memory 18 also stores data and programs used for performing the different operations of the mobile terminal according to embodiments of the present invention. That is, the controller 20 processes or controls the general operations or functions of the terminal 10.

In addition, the controller 20 controls the display 14 to display particular figures or objects on the screen. Then, when the user inputs particular commands into the terminal (e.g., touches the screen twice, etc.), the controller 20 animates the displayed figure or objects in accordance with the user's input operation. The controller 20 also changes or animates the displayed figure or object based on a tilting of the terminal 10, a temperature near the terminal 10, a lighting condition near the terminal 10, etc. The controller 20 also outputs different sounds via the audio processing unit 16 based on the animation of the figure or object on the screen.

The terminal 10 can also include other elements besides the above-described elements such as a broadcast receiving module that receives a broadcast signal from a broadcast network, a communication module that communicates with the wireless Internet, a camera module, a vibration module that generates a vibration, and various sensors.

Figure 2:
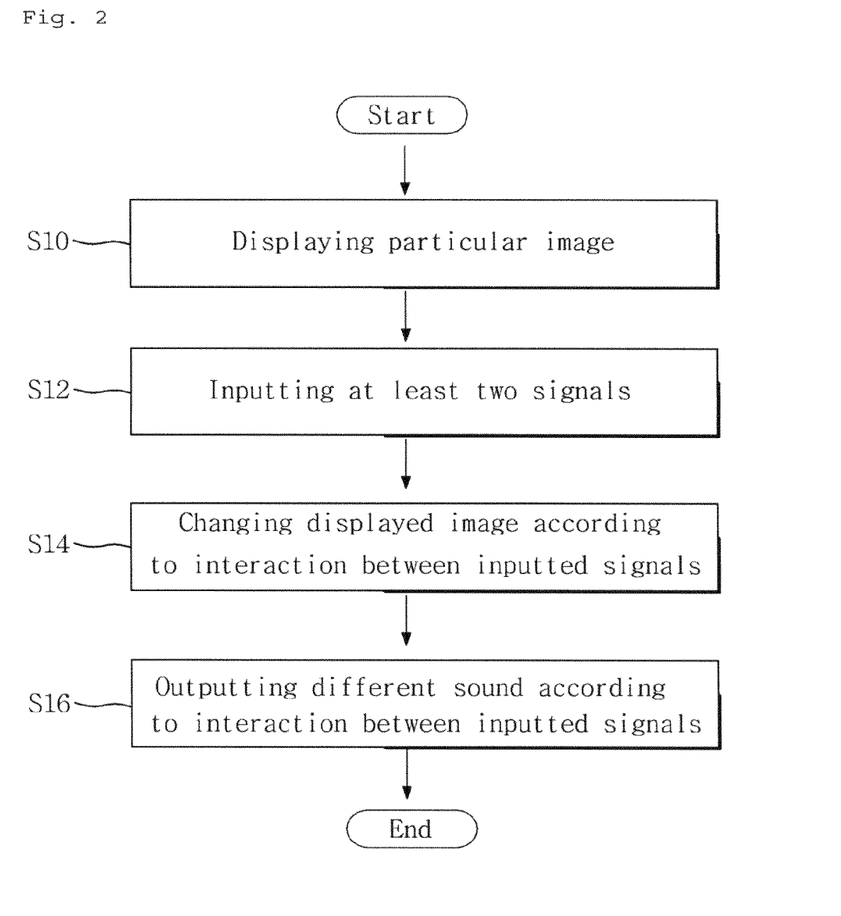
FIG. 2 is a flow chart illustrating an image control method according to an embodiment of the present invention.

Next, FIG. 2 is a flow chart illustrating an image control method according to an embodiment of the present invention, and FIGS. 3a to 3d show screen images obtained by applying the image control method through a touch screen according to an embodiment of the present invention. FIG. 1 will also be referred to in this description.

Figure 3A:
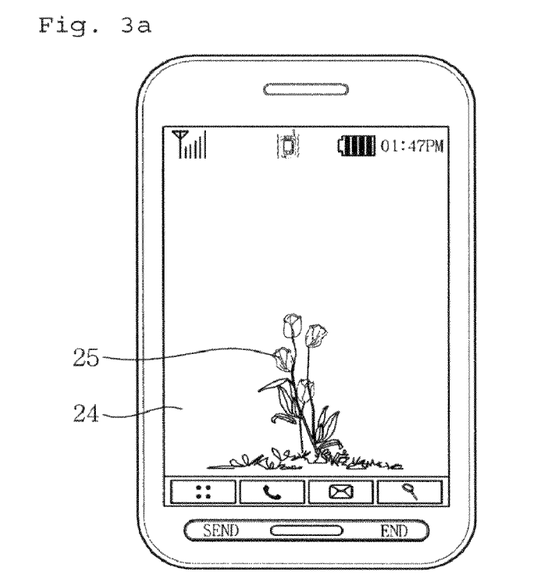
FIG. 3a is an overview illustrating an image of a flower being displayed on a screen of a mobile terminal according to an embodiment of the present invention.

With reference to FIGS. 2 and 3a, the mobile terminal 10 displays a particular image or object, e.g., a flower figure 25, on a touch screen 24 of the display 14 (S10). Further, in step S10, the flower figure 25 may be displayed as an idle screen image or a home screen image, a screen image selected after entering a particular menu, a screen image entered by a particular hot key, etc.

Figure 3B:
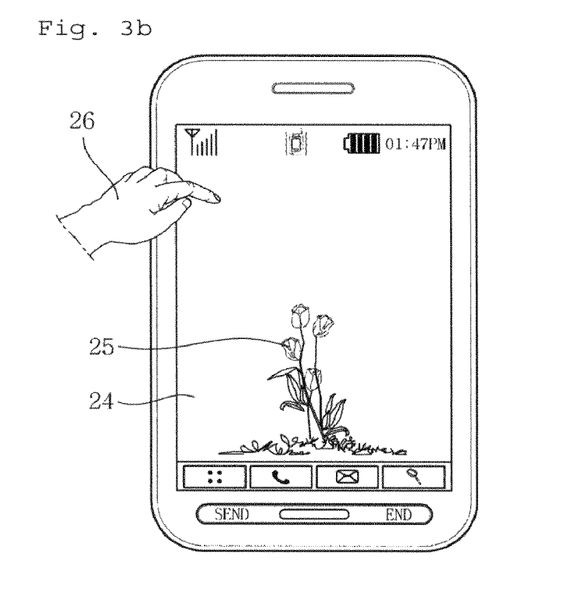
FIG. 3b is an overview illustrating a user touching the screen of the mobile terminal to begin animating the flower displayed on the screen according to an embodiment of the present invention.
Figure 3C:
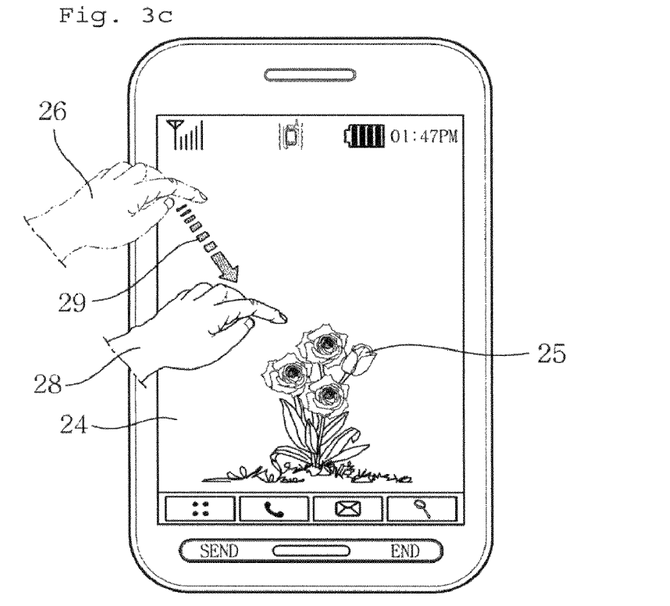
FIG. 3c is an overview illustrating the user again touching the screen of the mobile terminal to make the flower displayed on the screen bloom according to an embodiment of the present invention.

The user then inputs at least two signals to manipulate the displayed figure (S12). For example, as shown in FIGS. 3b and 3c, the user touches the touch screen 24 twice (i.e., a first touch 26 as shown in FIG. 3b and a second touch 28 as shown in FIG. 3c). Further, the first and second touches 26 and 28 may be two discontinuous touches or may be continuous touches according to a sliding operation from the first touch 26 to the second touch 28. The first and second touches 26 and 28 may also occur at the same time. The controller 20 then recognizes the first and second touches 26 and 28 as a command to animate or manipulate the displayed flower figure 25 on the touch screen 24.

Next, the controller 20 animates the displayed image according to an interaction between the inputted signals (S14). For example, as shown in FIG. 3c, when the user touches the screen 24 at the first touch 26 and the second touch 28 in a direction of the arrow 29, the controller 20 animates the flower figure 25 to be in full bloom.

Further, the controller 20 may change the shape of flower figure 25 differently according to the position relationship between the first and second touches 26 and 28. That is, as the second touch 28 nears the flower figure 25 or as the distance between the first and second touches 26 and 28 becomes long, the flowery figure 25 may burst into bloom. In addition, as the flower figure 25 nears the trace of movement of the first and second touches 26 and 28, it may flower more, and as the flower figure 25 is away from the trace of movement of the first and second touches 26 and 28, it may bloom less.

In addition, as discussed above, the controller 20 can also output different sounds according to the interaction between the inputted signals (S16). In this instance, the controller 20 may output the different sounds at the same time as the flower is changed into a blooming state, or may output the sounds before or after the flower is changed into the blooming state.

Figure 3D:
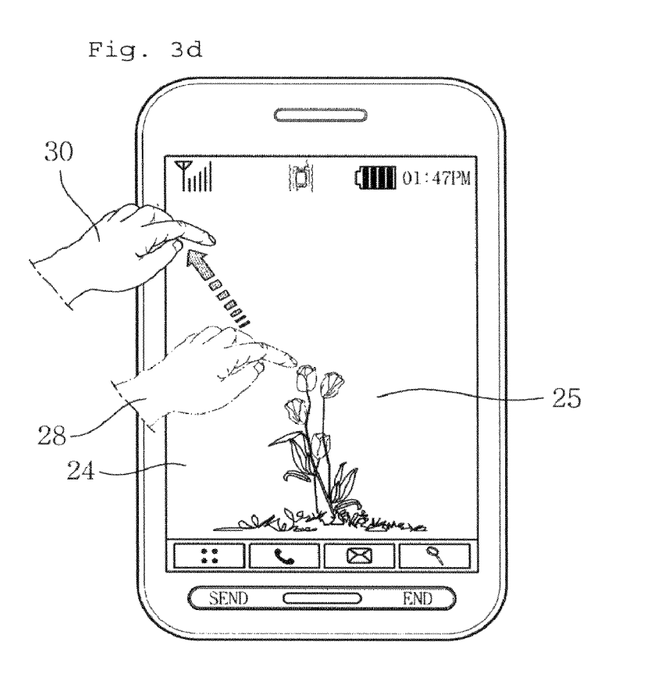
FIG. 3d is an overview illustrating the user again touching the screen of the mobile terminal to make the flower displayed on the screen not bloom according to an embodiment of the present invention.

Further, FIG. 3d illustrates the user again touching the touch screen 24 as a third touch 30. In this instance, the controller 20 returns the flower image 25 to its original state shown in FIG. 3a. The controller 20 can also return the flower image 25 to its original state after a predetermined amount of time after the second touch 28 in FIG. 3c, immediately after the user releases the second touch 28, or may leave the flower image 25 in the blooming state until the user performs the third touch 30.

As discussed above, the controller 20 changes the displayed figure based on the two input signals. The controller 20 can also differently animate the displayed figure based on how the two input signals are entered. For example, if the direction of the arrow 29 is as shown in FIG. 3c, the controller may display the flower image 25 as being in a full bloom state, whereas if the length of the direction arrow 29 is shorter, the controller 20 may display the flower image 25 as being a less or half bloom state. That is, the controller 20 may advantageously change the displayed image based on how the two input signals are input. Further, the distance of the input signals may be considered, the speed in which the signals are input, the positions where the touch occurs, etc.

Figure 4A:
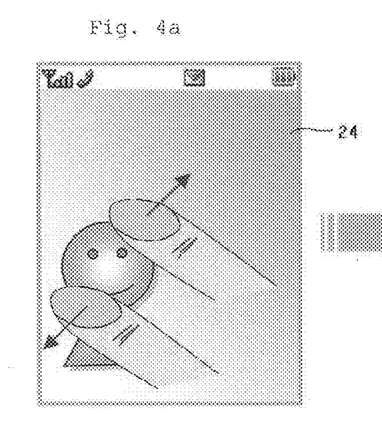
FIG. 4a is an overview illustrating a user using two fingers to animate an image displayed on a screen of a mobile terminal according to an embodiment of the present invention.
Figure 4B:
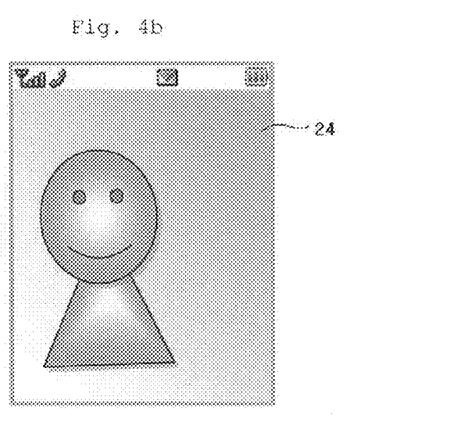
FIG. 4b is an overview illustrating the image displayed on the screen of the mobile terminal being animated based on the user using their two fingers according to an embodiment of the present invention.

Next, FIG. 4a is an overview illustrating a user using two fingers to animate an image displayed on a screen of a mobile terminal according to an embodiment of the present invention, and FIG. 4b is an overview illustrating the image displayed on the screen of the mobile terminal being animated based on the user using their two fingers according to an embodiment of the present invention.

In more detail, and as shown in FIG. 4a, the user first touches the touch screen 24 using their two fingers. Then, as shown in FIG. 4b, the user moves or drags their two fingers in an outward direction. In this instance, the controller 20 animates the first image, which is a child, into a second image, which is an adult. For example, the user may store a picture of a person as child and a picture of the same person as an adult. Then, the controller 20 displays the first picture (the child picture), and then when the user performs the input operations as shown in FIGS. 4a and 4b, the controller 20 displays the second image (the adult picture) such that the user can see the displayed image change from a child to an adult.

The controller 20 may also display the child image progressing through various stages into an adult based on a length of the dragging operation. For example, when the user touches and drags their two finger a long distance, the controller 20 displays the child image progressively changing into an older person. When the user touches and drags their fingers a shorter distance, the controller 20 can show the child image changing only into a teenager, for example.

The user may also store a first picture of a particular person when they are young and second picture of the person's father. Thus, the controller 20 can display the first picture of the person as a child and when the user inputs at least two input signals, the controller 20 can display the second picture. Thus, the controller 20 performs an animation function that animates the originally displayed object (e.g., the first picture) into a second different object (e.g., the second picture). That is, the controller 20 imparts life, interest, spirit, motion, or activity into the displayed object.

Thus, as shown in FIGS. 3a to 3d and FIGS. 4a and 4b, the controller 20 animates the displayed object based on the at least two signals corresponding to the displayed object. In addition, in FIGS. 3a to 3d and FIGS. 4a and 4b, the at least two input signals include first and second touching signals of the screen 24 of the mobile terminal. However, as will be discussed later, the at least two input signals may also include touching and tilting signals of the mobile terminal, a first proximity signal and a second proximity signal of the mobile terminal, illumination signals, temperature signals, sound or voice signals, etc.

In addition, the user is also provided with the appropriate menu options such that he or she can designate which objects are to be animated.

Figure 5A:
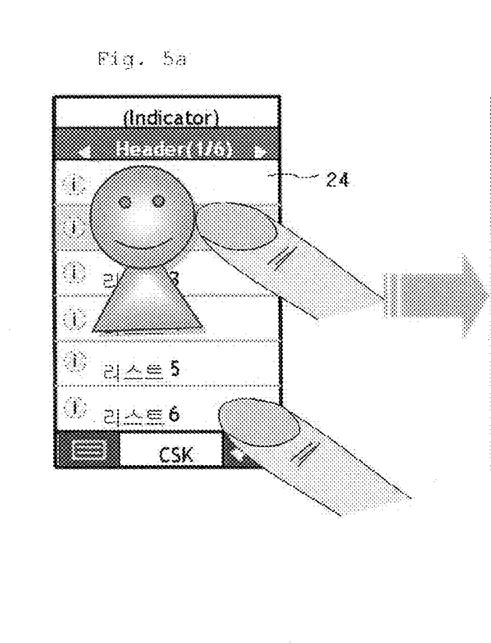
FIG. 5a is an overview illustrating a user touching an image displayed on a screen of a mobile terminal according to another embodiment of the present invention.
Figure 5B:
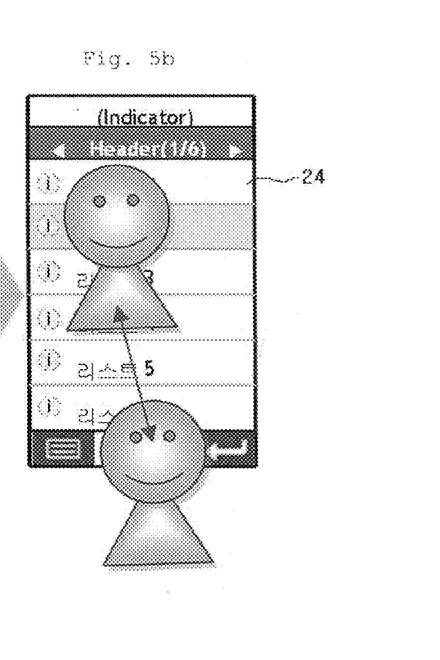
FIG. 5b is an overview illustrating the image displayed on the screen of the mobile terminal being moved based on the user's manipulation in FIG. 5a according to an embodiment of the present invention.

Next, FIGS. 5a and 5b illustrate the user moving an object (in this instance an icon of a happy face) off of a displayed menu list. In more detail, and as shown in FIG. 5a, the user first touches the screen 24 at a position corresponding to the displayed icon and then touches the screen 24 at a second position that is away from the displayed menu list. Then, as shown in FIG. 5b, the controller 24 moves the displayed icon from the first touched position to the second touched position.

Figure 6A:
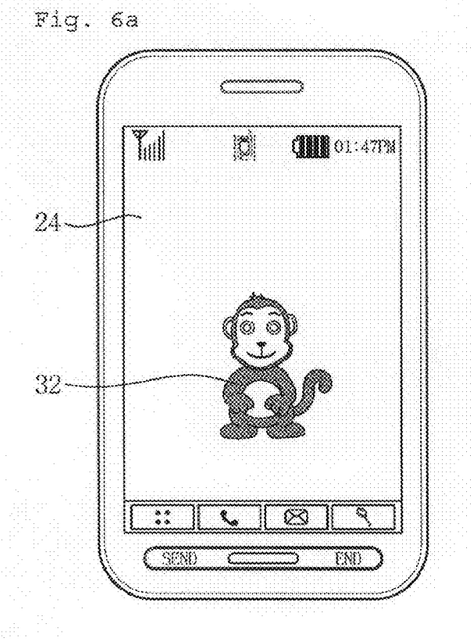
FIG. 6a is an overview illustrating an image of a monkey being displayed on a screen of a mobile terminal according to an embodiment of the present invention.
Figure 6B:
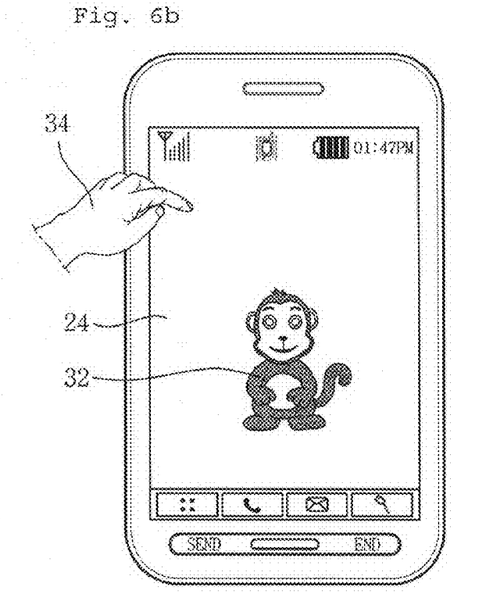
FIG. 6b is an overview illustrating a user touching the screen of the mobile terminal to begin animating the monkey displayed on the screen according to an embodiment of the present invention.

Next, a description will be given with respect to FIGS. 6a to 6c by referring to the flow chart shown in FIG. 2. In more detail, and as shown in FIG. 6a, a particular object 32 (i.e., an image or icon of a monkey) is displayed on the screen 24 of the mobile terminal (S10). Then, the user inputs at least two signals (S12). In this instance, the two signals include a touching signal 34 in which the user touches the screen 24 (see FIG. 6b) and a tilting signal 36 in which the user tilts the mobile terminal (see FIG. 6c).

Figure 6C:
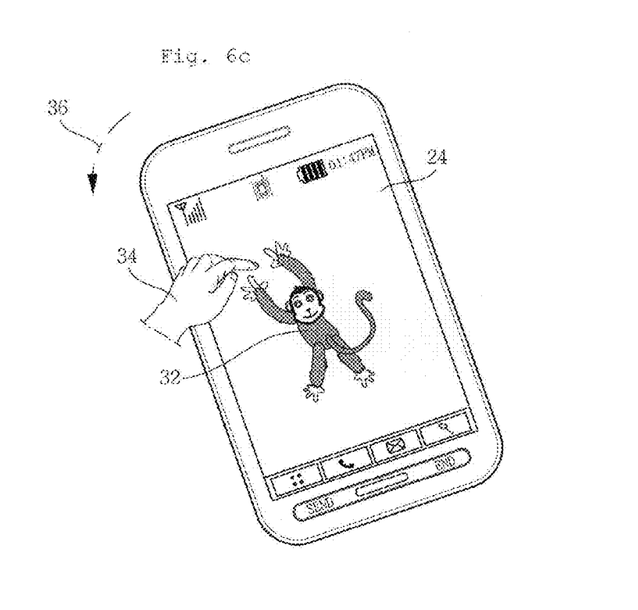
FIG. 6c is an overview illustrating the user again touching the screen of the mobile terminal to make the monkey displayed on the screen move according to an embodiment of the present invention.

As shown in FIG. 6c, the controller 20 animates the displayed object (monkey) such that the monkey hangs from the point of the first touch 34 (S14). The controller 20 can also output a sound corresponding to the animation of the monkey (e.g., monkey sounds) (S16). The controller 20 may output the sound at the same time the monkey is animated or may output the sound before or after the animation of the monkey. The animation of the monkey may also include a video picture of the monkey which is continuously played as long as the user maintains the first touching position 34. When the user removes his or her finger, the controller can return the monkey to its original position as shown in FIG. 6a.

Further, the controller 20 may control or animate the monkey-shaped figure 32 based on a tilting degree, a tilting speed, or the like of the mobile terminal. For example, if the tilting speed is fast, the monkey-shaped figure 32 may be quickly hung down from the position of the first touching position 34 at the speed corresponding to the tilting speed.

Figure 7A:
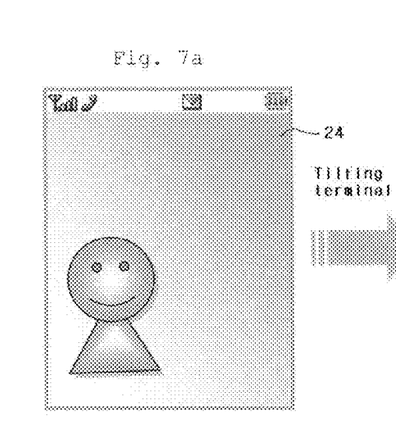
FIG. 7a is an overview illustrating an image being displayed on a mobile terminal according to an embodiment of the present invention.
Figure 7B:
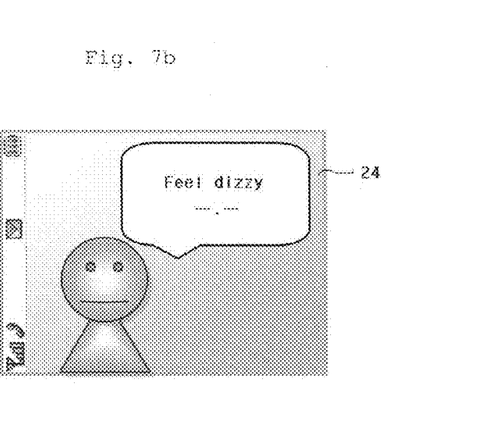
FIG. 7b is an overview illustrating the image being displayed on the mobile terminal providing an expression based on a movement or tilting of the mobile terminal according to an embodiment of the present invention.

FIGS. 7a and 7b illustrate another embodiment in which the at least two input signal include a touching signal and a tilting signal. As shown in FIG. 7a, the controller 20 displays an icon or image of a happy face figure. Then, when the user touches the displayed happy face figure and then tilts the mobile terminal, the controller 20 animates the happy face figure to appear that the happy face figure is dizzy. The controller 20 also displays text information corresponding to the expression of the displayed figure. Thus, in this embodiment, the controller 20 changes an expression of the displayed object when animating the object and display textual information corresponding to the particular animation.

Figure 8A:
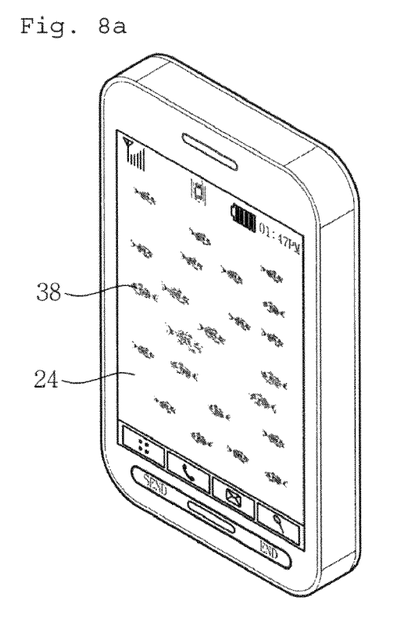
FIG. 8a is an overview illustrating an image of a school of fish being displayed on a screen of a mobile terminal according to an embodiment of the present invention.
Figure 8B:
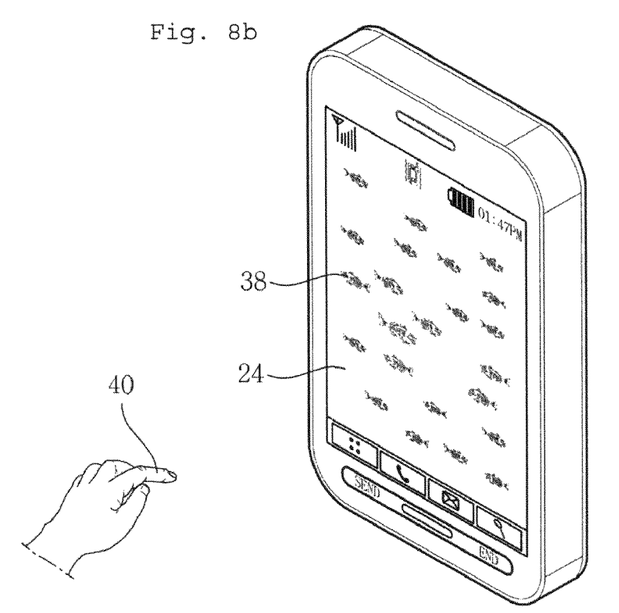
FIG. 8b is an overview illustrating a user moving their finger towards the screen of the mobile terminal to begin animating the school of fish displayed on the screen according to an embodiment of the present invention.
Figure 8C:
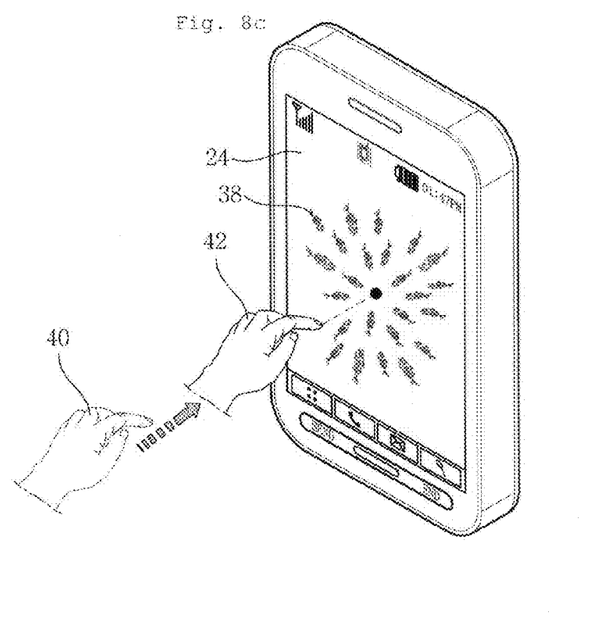
FIG. 8c is an overview illustrating the user continuing to move their finer towards the screen of the mobile terminal to make the school of fish displayed on the screen move according to an embodiment of the present invention.

Next, FIGS. 8a to 8c are overview illustrating an embodiment in which the mobile terminal includes an inductive proximity sensor that can sense the user's finger or other object approaching the mobile terminal. In more detail, the controller 20 first displays an image or object which is a pool of fish 38. Then, as shown in FIG. 8b, the user moves his finger towards the screen 24. Thus, the proximity sensor determines this action as the first proximity signal 40. Then, as shown in FIG. 8c, the user moves his finger to a second position closer to the mobile terminal. The controller 20 determines this second position as a second proximity signal 42.

Also, as shown in FIG. 8c, the controller 20 animates the pool of fish 38 based on the first and second proximity signals 40 and 42 such that the school of fish 38 swim toward the user's finger. Similar to the other embodiments, the controller 20 may control the speed at which the pool of fish 38 swim based on how fast the user moves his finger towards the screen 24 of the mobile terminal.

Further, the controller 20 can output different sounds corresponding to the animation of the figure. For example, the controller 20 can output sounds of the school of fish may together with the fish-like figure 38 gathering on the extending line of the display 14 and the direction of the user moving his finger toward the display. Thus, in FIGS. 8a to 8c, the two input signals include first and second proximity signals.

Figure 9A:
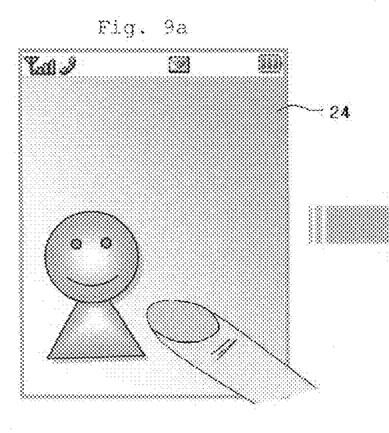
FIG. 9a is an overview illustrating an image being displayed on a mobile terminal according to an embodiment of the present invention.
Figure 9B:
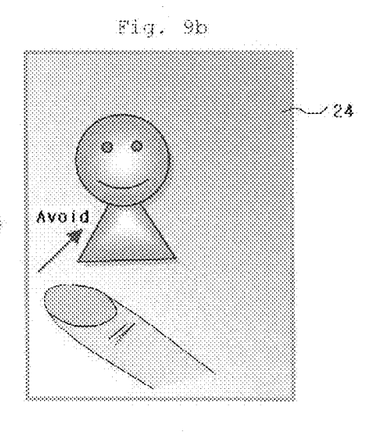
FIG. 9b is an overview illustrating the image being displayed on the mobile terminal avoiding a user's touch according to an embodiment of the present invention.

FIGS. 9a and 9b are overviews illustrating another embodiment in which the controller 20 animates a displayed image to avoid or move away from the user's finger approaching the display. That is, when the user first touches the display icon or figure (or the display), and then moves their finger toward the displayed icon or figure, the controller 20 moves the icon or figure away from the user's finger.

Figure 10A:
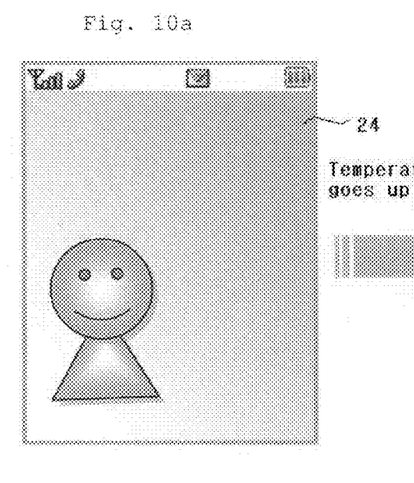
FIG. 10a is an overview illustrating an image being displayed on a mobile terminal according to an embodiment of the present invention.
Figure 10B:
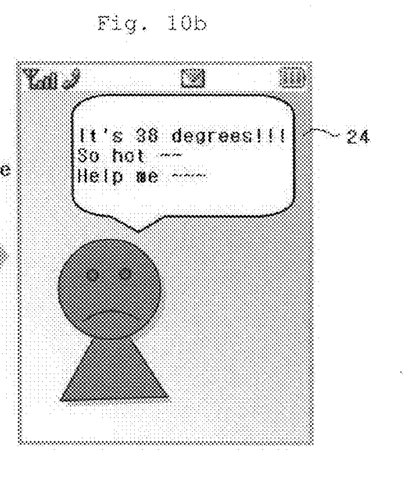
FIG. 10b is an overview illustrating the image being displayed on the mobile terminal providing an expression based on a temperature according to an embodiment of the present invention.

FIGS. 10a and 10b are overviews illustrating an embodiment in which the mobile terminal includes a temperature sensor. As shown in FIGS. 10a and 10b, when the ambient temperature goes up or down, which is sensed by the temperature sensor, the facial expression or comment of the object or figure displayed on the touch screen 24 is changed or animated. For example, the happy face figure is changed or animated into a sad face, and a corresponding textual expression is displayed along with the animated figure.

Figure 11A:
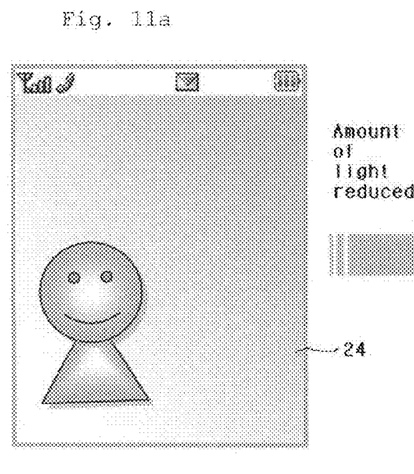
FIG. 11a is an overview illustrating an image being displayed on a mobile terminal according to an embodiment of the present invention.
Figure 11B:
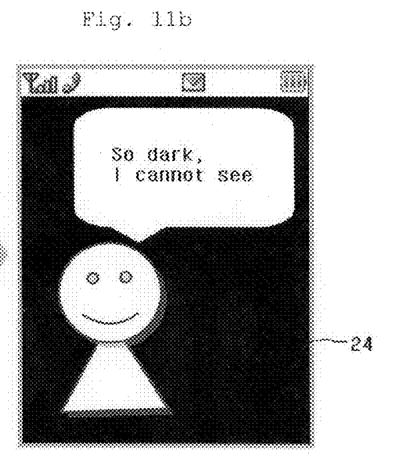
FIG. 11b is an overview illustrating the image being displayed on the mobile terminal providing an expression based on an amount of light according to an embodiment of the present invention.

FIGS. 11a and 11b are overviews illustrating yet another embodiment of the present invention. In this embodiment, the mobile terminal includes an illumination sensor that senses an amount of illumination. As shown in FIGS. 11a and 11b, when the amount of ambient light is increased or decreased as it is sensed by the illumination sensor, a facial expression or comment of a figure displayed on the touch screen 24 is changed or animated. The controller 20 may also add a textual expression to the mood of the animated figure.

Further, the above-described embodiments may be combined together. For example, the flower figure in FIGS. 3a to 3d may be additionally animated based on an amount of ambient light (discussed with respect to FIGS. 11a and 11b), based on a temperature amount (discussed with respect to FIGS. 10a and 10b), based on a tilting amount (discussed with respect to FIGS. 6a to 6c and 7a and 7b), based on the proximity signals (discussed with respect to FIGS. 8a to 8c), etc.

For example, if the ambient light is low, the flower figure may bloom less than when the ambient light is high. A similar concept applies to the temperature. The controller 20 can also display textual information or output sound information corresponding to the low light, temperature, etc. In addition, sound or voice commands may also be used to perform a particular function. That is, the user can touch a particular displayed object, and speak into the terminal to have the object animated in a particular fashion (e.g., I want the flower to bloom). The controller 20 then can convert the spoken language into commands to animate the particular object.

In addition to the above embodiments including the first and second touching signals, the touching and tilting signals, the first and second proximity signals, the touching signal and the illumination signal, the touching signal and the temperature signal, and the touching signal and the sound signal, it is also possible to perform multiple touches on the touch screen 24 to have the controller 20 animate a particular object. The animation of the object may also include changing the feelings, facial expressions, color, shape, etc. of the object or figure.

Further, the environments in which the object or figure is displayed may be changed or animated according to an ambient temperature as it is sensed by the temperature sensor. For example, the ambience of a flower figure may be flowered, frozen, or shed leaves based on the sensed temperature.

Thus, in accordance with the embodiments of the present invention, the user can entertain friends and family, and have fun with their mobile terminal.

Further, in the above-described embodiments, the mobile communication terminal is taken as an example, but the present invention is applicable to various types of mobile terminals such as information home appliances, PDAs, MP3, notebook computers and the like.

Further, the above descriptions refer to interactions between at least two signals, but the present invention is not limited thereto. That is, any displayed figures or objects may be changed/transformed/animated according to interactions between combinations of various input signals available for the mobile terminal, such as sound recognition signals, key input signals via a keypad, a navigation key, etc., as well as the at least two touch signals, tilt signals, proximate signals, etc.

For example, when the displayed object is an image of a child, the child figure may be animated or changed into an adult figure by opening and closing the user's two fingers, or vice versa. In this instance, the user's two fingers may be placed on the touch screen, or may be separated from the display 14 when the mobile terminal includes an inductive proximate sensor.

Further, in the above-described embodiments, the objects or figures include flowers, monkeys, and fish, but the present invention is not limited thereto. That is, the objects or figures may be diversified such as a particular animal, plant, microorganism, an inanimate matter, etc. In addition, the figures may have an actually existing form such as avatar or animation, or may have a newly created form.

Also, in the above-described embodiments, each figure or object is displayed solely on the display, but the present invention is not limited thereto. For example, each figure may be displayed on a portion of a screen image on which an application program has been executed, or may be displayed on a portion of a screen image on which a particular menu has been executed.

In the above-described embodiments, each figure is animated and different sounds are output according to the interaction between at least two signals, but the present invention is not limited thereto. That is, only the object or figure may be animated without emitting sounds or the same sounds may be continuously emitted according to the input of at least two signals. The sounds may also be related to the figure or unrelated to the figure.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of displaying information on a mobile terminal, the method comprising:
   displaying an object on a screen of the mobile terminal;
   receiving at least two proximity signals of the mobile terminal corresponding to the displayed object; and
   manipulating the displayed object based on at least one of a relative position and a time interval between the at least two proximity signals corresponding to the displayed object,
   wherein the manipulating step manipulates characteristics of the displayed object such that the displayed object transforms into a variation of an original version of the displayed object, and
   wherein a position of each of the proximity signals includes at least one of a distance between an object approaching the screen and the screen, and a point of the screen corresponding to a proximity point of the object approaching the screen.

2. The method of claim 1, wherein the displayed object comprises an image, a figure, an icon or a menu.

3. The method of claim 1, wherein the manipulating step comprises:
   moving the displayed object on the screen.

4. The method of claim 1, wherein the manipulating step comprises:
   changing an expression of the displayed object.

5. The method of claim 1, wherein the manipulating step comprises:
   making the displayed object perform an action.

6. The method of claim 1, further comprising:
   outputting sound information corresponding to the manipulation of the displayed object.

7. A mobile terminal, comprising:
   a touch screen display unit configured to display an object on a screen of the mobile terminal;
   a proximity sensor configured to sense at least two proximity signals; and
   a control unit configured to manipulate the displayed object based on at least one of a relative position and a time interval between the at least two proximity signals corresponding to the displayed object,
   wherein the control unit is further configured to manipulate characteristics of the displayed object such that the displayed object transforms into a variation of an original version of the displayed object, and
   wherein a position of each of the proximity signals includes at least one of a distance between an object approaching the screen and the screen, and a point of the screen corresponding to a proximity point of the object approaching the screen.

8. The mobile terminal of claim 7, wherein the displayed object comprises an image, a figure, an icon or a menu.

9. The mobile terminal of claim 7, wherein the control unit is further configured to move the displayed object on the screen.

10. The mobile terminal of claim 7, wherein the control unit is further configured to change an expression of the displayed object.

11. The mobile terminal of claim 7, wherein the control unit is further configured to make the displayed object perform an action.

12. The mobile terminal of claim 7, the control unit is further configured to output sound information corresponding to the manipulation of the displayed object.

* * * * *